United States Patent [19]

Tamura et al.

[11] Patent Number: 4,995,667
[45] Date of Patent: Feb. 26, 1991

[54] VEHICLE SLIDING ROOF SYSTEM

[75] Inventors: Michio Tamura; Fumio Furuki, both of Saitama, Japan

[73] Assignee: Honda Giken Kogyo Kabushiki Kaisha, Tokyo, Japan

[21] Appl. No.: 317,323

[22] Filed: Mar. 1, 1989

[30] Foreign Application Priority Data

Mar. 3, 1988 [JP] Japan .................................. 63-50375

[51] Int. Cl.$^5$ ............................................. B60J 7/047
[52] U.S. Cl. .................................... 296/216; 296/220; 296/223
[58] Field of Search ................ 296/216, 220, 222, 223

[56] References Cited

U.S. PATENT DOCUMENTS 4,563,036 1/1986 Bauer ................................. 296/218

FOREIGN PATENT DOCUMENTS

| 0271987 | 6/1988 | European Pat. Off. | 296/216 |
| 0143719 | 8/1984 | Japan | 296/222 |
| 0016126 | 1/1986 | Japan | 296/216 |
| 0018517 | 1/1986 | Japan | 296/216 |
| 0261527 | 11/1987 | Japan | 296/216 |
| 0242720 | 10/1988 | Japan | 296/216 |

Primary Examiner—Dennis H. Pedder
Attorney, Agent, or Firm—Armstrong, Nikaido, Marmelstein, Kubovcik & Murray

[57] ABSTRACT

A vehicle sliding roof system for a roof structure in which a roof opening extending substantially over the entire width of the roof is defined between a front roof and a rear roof. A moveable central roof is guided for its motion by a pair of guide arms each having one end slidably guided by a first guide rail provided in the fixed rear roof and another end guided by a second guide rail provided in the moveable central roof. As the one end of each of the guide arms is moved along the first guide rail, the guide arm turns from a relatively lateral attitude to a more longitudinal attitude. Additionally, each of the second guide rails extends obliquely in such a manner that an internal end of the second guide rail is located behind an external end of thereof. Owing to these geometrical arrangements of the guide arms and the guide rails, the travel of the moveable central roof is maximized for a given longitudinal dimension of the first guide rails, and the possible roof opening area is thus maximized. This system may be favorably applied to the T-bar roof structure in which a bar member extends between the central parts of the front and rear roofs, and, in this case, the front end of the moveable roof may be guided along the bar member for added rigidity of the sliding roof structure.

20 Claims, 4 Drawing Sheets

VEHICLE SLIDING ROOF SYSTEM

TECHNICAL FIELD

The present invention relates to a sliding roof system for vehicles in which a roof opening extending substantially across the entire width of the roof is defined between a front roof and a rear roof, and in particular to such a sliding roof system which offers a maximum opening area by minimizing the space requirements for the linkage and guide mechanism for accomplishing the sliding motion of the sliding roof. The present invention is also related to a tilting roof system which may be combined with the sliding roof system.

BACKGROUND OF THE INVENTION

Some open top vehicles are provided with detachable hard roofs to maximize the riding comfort of the vehicles according to the weather. However, in most vehicles, it is extremely difficult to find a space for stowing away the detached roof. When the vehicle is provided with a fixed front roof and a fixed rear roof defining a roof opening extending across the entire width of the roof, the detachable roof consists of a substantially planar member, but it still is difficult to find a space to accommodate the detached roof within the vehicle in most cases. Such a roof structure is often provided with a central bar member connecting the central parts of the front and rear roofs for added rigidity, and such a roof structure is called as a T-bar roof.

For passenger cars and recreational vehicles, sliding roofs are widely used, and an example of such a sliding roof is disclosed in copending United States Pat. application Ser. No. 159,082 filed Feb. 23, 1988. However, such sliding roofs cannot be applied to those open top vehicles where the roof opening extends substantially across the entire width of the roof because the guide rails must extend along either lateral side of the roof and thus seriously interfere with the open top roof structure. Japanese Pat. laid open publication No. 59-143719 discloses a sliding roof structure for a T-bar roof in which a guide rail for guiding a front part of the sliding roof extends along the bar member extending between the front and rear roofs and a pair of guide rails for guiding rear parts of the sliding roof extend along either side portion of the rear roof. However, according to this proposal, the possible travel distance of the sliding roof is limited by the length of the guide rails provided in the rear roof. In other words, the ratio of the roof opening area to the entire roof area is quite limited, and the comfort of an open top vehicle can be obtained only to a limited extent.

BRIEF SUMMARY OF THE INVENTION

In view of such problems of the prior art, a primary object of the present invention is to provide a vehicle sliding roof system which is capable of selectively closing a roof opening extending across the entire width of the roof with minimal space requirements for the guide rails and other linkage mechanisms for achieving the sliding motion of the sliding roof.

A second object of the present invention is to provided a vehicle sliding roof system which can move the sliding roof along the longitudinal direction of the vehicle over a larger distance than was possible heretofore for a given size of the rear roof.

A third object of the present invention is to provide a vehicle sliding roof system which features a highly simple structure for lifting the sliding roof when the sliding roof is about to be opened from its fully closed state so as to permit a unified contour of the roof when the sliding roof is fully closed.

A fourth object of the present invention is to provide a vehicle sliding or tilting roof system which can secure the moveable roof with a sufficient rigidity even when the moveable roof is open.

According to the present invention, these and other objects can be accomplished by providing: a vehicle sliding roof system, comprising: a fixed front roof; a fixed rear roof defining a roof opening extending substantially across the entire width of the fixed front and rear roofs in cooperation with the front roof; a moveable central roof for selectively closing the roof opening defined between the fixed front and rear roofs; a pair of first guide rails each extending on the upper surface of the rear roof along a path containing both lateral and longitudinal components; a pair of guide arms each having one end slidably engaged via guide shoe means with one of the first guide rails and another end pivotally engaged with a part of the moveable central roof; and drive means for moving the one end of each of the guide arms along the corresponding first guide rail.

According to this broad concept of the present invention, the moveable central roof serving as a sliding roof can be slid rearwardly more than the longitudinal dimension of the first guide rails, in particular, by rotation of the guide arms in a horizontal plane when each of the first guide rails extends from a central front part of the rear roof to a laterally more external rear part of the rear roof along a curved path which is concave toward the center of the vehicle and/or when the guide shoe means is provided with means for orienting the one end of the guide arm to a prescribed direction with respect to the tangential direction of the first guide rail.

Additionally or alternatively, the other end of each of the guide arms is engaged with a second guide rail provided in the moveable central roof which extends obliquely in such a manner that an external end of the second guide rail is located behind an internal end of the second guide rail. The inclination of the second guide rails converts the lateral component of the motion of the other end of the guide arms into a longitudinal motion of the sliding roof, and the longitudinal travel distance of the sliding roof is thus further increased.

In the case of a T-bar roof or when a central bar member extends between the laterally central parts of the front roof and the rear roof across the roof opening for increasing the overall strength and rigidity of the roof structure, the supporting rigidity of the sliding roof in its open state and during its sliding motion can be improved if the front part of the sliding roof is guided by a third guide rail extending along the central bar member.

As a favorable arrangement for achieving the angular motion of the guide arms in a horizontal plane, the orienting means of each of the guide shoe means may be provided with a pair of guide shoe members which are spaced apart along the lengthwise direction of the corresponding guide arm. Further, when the roof is to have a smooth and unified contour when the sliding roof is fully closed, the sliding roof is required to be lifted from the fully closed position before being slid rearward. This action may be produced with a very simple structure if each of the first guide rails is provided with vertical slope means which tends to lift one of the shoe members more remote from a terminal end of the one end of the guide arm than the other shoe member as the one end is moved along the first guide rail from its frontmost part towards the rear. To better achieve this goal, the drive means may comprise a pin attached to a power transmitting member, and a slot provided in the one end of the corresponding guide arm for receiving the pin, the slot being provided with an inclined cam surface for imparting a lifting motion to the moveable central roof when the moveable roof is opened from its fully closed state.

To maximize the geometric advantages for moving the sliding roof without causing the guide arms to protrude laterally from the roof contour, each of the guide arms may be curved so as to face the central part of the vehicle with its concave side. Particularly favorable results will be obtained in maximizing the head clearance of the passenger compartment without increasing the overall height of the roof if each of the guide arms is adapted to be received in the grooves defined in the first guide rails by being conformal to the guide rail.

A favorable rigidity of a sliding roof can be attained if the vehicle sliding roof system comprises: a fixed front roof; a fixed rear roof defining a roof opening extending substantially across the entire width of the fixed front and rear roofs in cooperation with the front roof; a moveable central roof for selectively closing the roof opening defined between the fixed front and rear roofs; guide means for guiding the moveable central roof along a longitudinal direction of a vehicle body; a pair of guide arms each having one end pivotally engaged with the fixed rear roof and another end pivotally engaged with the moveable central roof, the pivotal engagement parts at the two ends of each of the guide arms each permitting at least a relative rotational motion about a vertical axial line; and drive means for moving the moveable central roof along the longitudinal direction of the vehicle body.

A similar advantage can be attained in a tilting roof system, which may be combined with a sliding roof system, if it comprises a fixed front roof; a fixed rear roof defining a roof opening extending substantially across the entire width of the fixed front and rear roofs in cooperation with the front roof; a moveable central roof for selectively closing the roof opening defined between the fixed front and rear roofs by tilting about a front or rear edge thereof; a pair of guide arms each having one end pivotally engaged with the fixed rear roof at a relatively laterally central part of the fixed rear roof and another end pivotally engaged with the moveable central roof at a relatively laterally external part of the moveable central roof, at least one of the pivotal engagement parts at the two ends of each of the guide arms being provided with guide means for guiding the corresponding end of the guide arm along a path containing a lateral component, and both of the pivotal engagement parts at the two ends of each of the guide arms permitting at least a relative rotational motion about a longitudinal axial line extending along a fore-and-aft direction of the vehicle body.

BRIEF DESCRIPTION OF THE DRAWINGS

Now the present invention is described in the following with reference to the appended drawings, in which.

DESCRIPTION OF THE PREFERRED EMBODIMENTS

Figure 1:
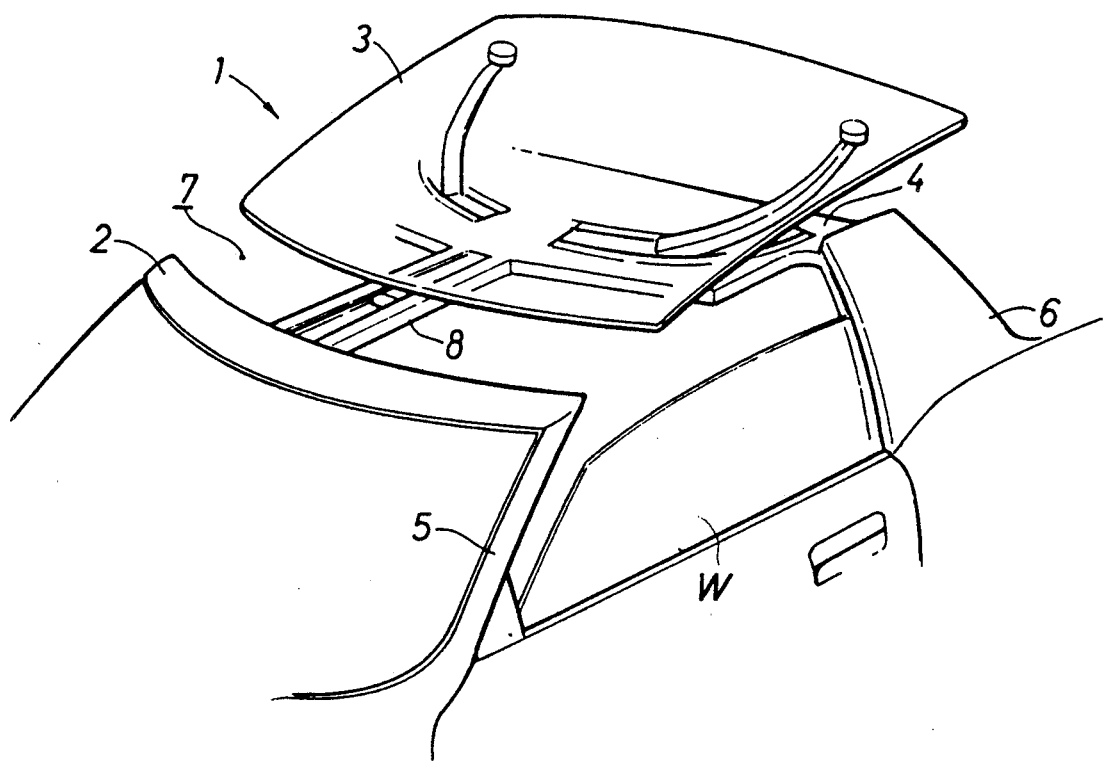
FIG. 1 is a perspective view showing a vehicle sliding roof structure to which the present invention is applied.
Figure 2:
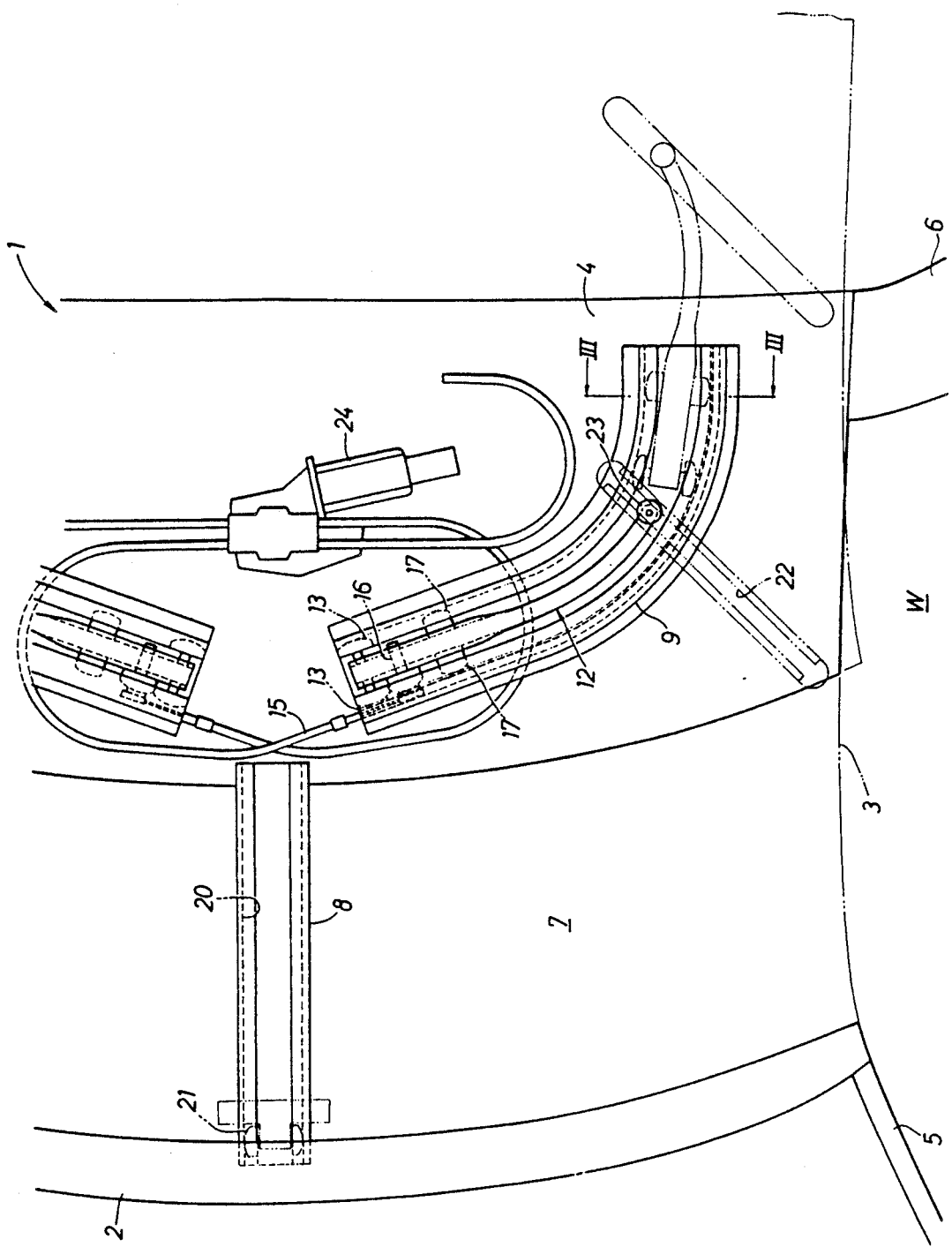
FIG. 2 is a plan view of the guide structure for the sliding roof structure shown in FIG. 1.

FIGS. 1 and 2 generally show the vehicle sliding roof system according to the present invention. As can be readily understood, the preferred embodiment of the vehicle sliding roof system of the present invention is typically symmetric about the central longitudinal line of the vehicle body as seen above, and, therefore, only one half of such a symmetric structure will be mentioned in some of the following disclosure for the convenience of description. The roof 1 of the vehicle body consists of a front roof 2, a central roof 2 and a rear roof 4, which are separated from each other. The front roof 2 and the rear roof 4 are rigidly supported by the vehicle body by way of front pillars 5 and rear pillars 6, respectively, and the central roof 3 is constructed as a sliding roof which selectively closes an opening 7 defined between the front and rear roofs 2 and 4. The opening 7 extends over the entire width of the roof 2 with the lateral ends of the opening 7 being defined by side windows W. The desired rigidity of the roof is ensured by connecting the laterally central parts of the front and rear roofs 2 and 4 with a connecting bar member 8.

Figure 3:
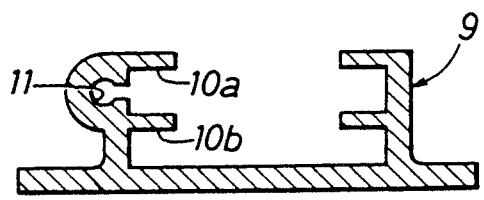
FIG. 3 is a sectional view taken along line III—III of FIG. 2.

The upper surface of the rear roof 4 is provided with a pair of first guide rails 9 each of which curves from the central front part of the rear roof 4 to the laterally external and rear part of the rear roof 4 with its center of curvature located substantially in the central of the vehicle body. As best shown in FIG. 2, the two guide rails 9 are arranged symmetrically to each other about a central longitudinal line of the vehicle body. Referring to FIG. 3, each of the first guide rails 9 is provided with two pairs of vertically spaced guide slots 10a and 10b each defined by a pair of mutually opposing grooves provided in either internal side wall thereof. A cable guide groove 11 is provided in the bottom part of one of the grooves defining the upper guide slot 10a which is situated more radially inwardly than the other groove. The guide arm 12 is slidably interposed between the mutually opposing side walls of the first guide rail 9.

Figure 4:
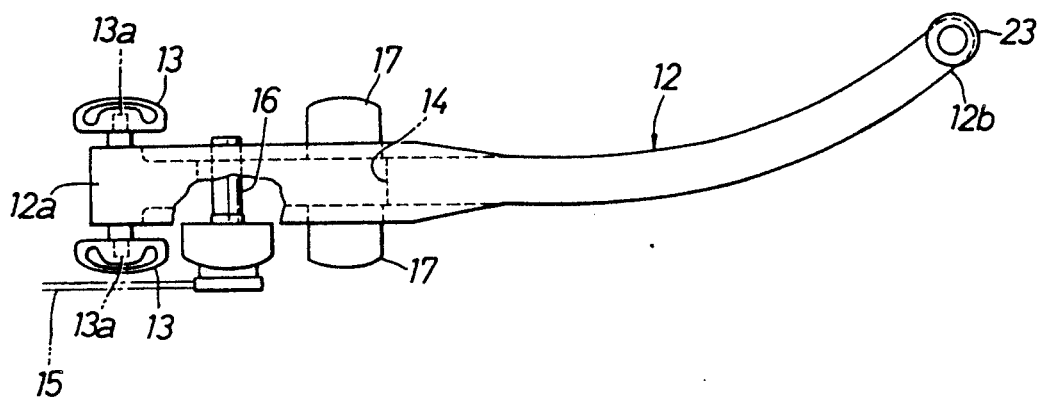
FIG. 4 is a plan view of the guide arm.
Figure 5:
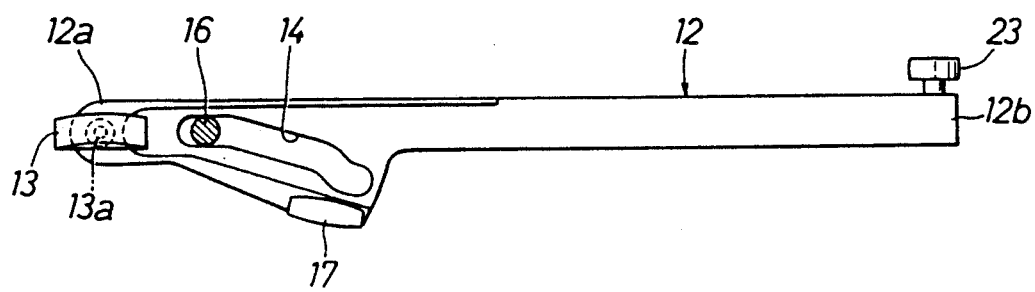
FIG. 5 is a side view of the same.

As shown in FIGS. 4 and 5, the guide arm 12 is substantially conformal to the first guide rail 9 as seen from above, and is engaged with the upper slot 10a of the first guide rail 9 at its one end 12a via a pair of slide shoes 13 made of self-lubricating and elastic material such as fluoride resin. The slide shoes 13 are rotatably attached to pins 13a projecting from the one end 12a of the guide arm 12.

The one end 12a of the guide arm 12 engaging with the first guide rail 9 is further provided with a slot 14 which laterally extends through the guide arm 12 and inclines downwardly from the area adjacent the slide shoes 13 towards the other end 12b of the guide arm 12. The slot 14 receives a pin 16 which is pushed and pulled by a push-pull cable 15, and is adapted to be guided by the upper slot 10a of the first guide rail 9 for its motion along the first guide rail 9.

A pair of projections 17 project laterally from the lower vicinity of a terminal end of the slot 14 remote from the slide shoes 13 for engagement with the lower slot 10b of the first guide rail 9. The bottom surface of the part of the first guide rail 9 adjacent its innermost end is provided with a cut-out 18 for permitting the projections 17 to be disengaged downwardly from the lower slot 10b when the one end 12a of the guide arm 12 is located at the innermost end of the first guide rail 9, and is further provided with a downward slope 19 in the edge of the bottom wall of the first guide rail 12 defining the cut-out 18 at the end remote from the innermost end of the guide rail 9 for guiding the projections 17.

The lower surface of each of the lateral ends of the rear part of the central roof 3 is provided with a second guide rail 22 with its open side facing downward, the second guide rail being 22 substantially linear and inclined from a lateral direction with its inner end displaced to the rear as best shown in FIG. 2. The second guide rail 22 receives a roller follower 23 of a ball joint type which is attached to the other end 12b of the guide arm 12.

On the upper surface of the connecting bar member 8 extends a third guide rail 20 having a C-shaped cross section with its open side directed upwards. A pair of guides shoes 21 similar to the guide shoes 13 engage with the second guide rail 20. The guide shoes 21 are attached to the central part of the front end of the lower surface of the central roof 3 for thus guiding the front end of the central roof 3 for its sliding motion with a sufficient rigidity.

The push-pull cable 15 is of a known type which is pushed and pulled by a drive device 24 consisting of a reduction gear and an electric motor which is located in the central part of the upper surface of the rear roof 4, and one end of the cable 15 is attached to the pin 16.

Now the operation of this embodiment is described in the following.

Figure 6:
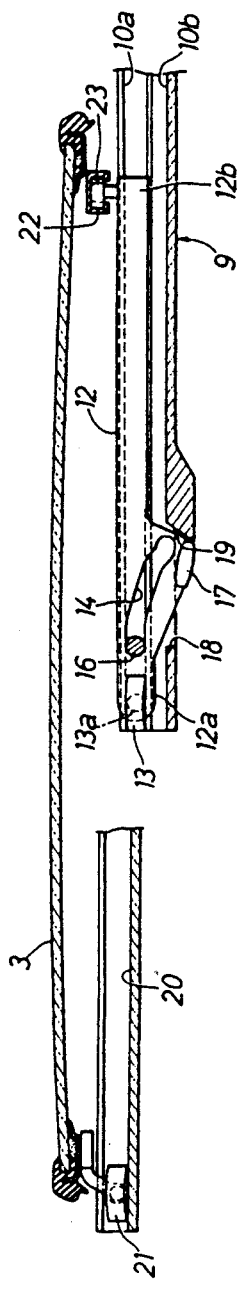
FIGS. 6 through 8 are vertical sectional side views showing the operation of the guide arms.

When the central roof 3 is fully closed, the push-pull cable 15 is pulled all the way until the one end 12a of the guide arm 12 is located at the innermost end of the first guide rail 9. At the same time, the projections 17 are dropped from the lower slot 10b into the cut-out 18 to dispose the guide arm 12 substantially horizontally and make the upper surface of the central roof 3 follow the general contour surface of the roof 1 with the guide arm 12 being substantially received in the space or the slot defined between the two side walls of the guide rail 9 (FIG. 6).

Figure 7:
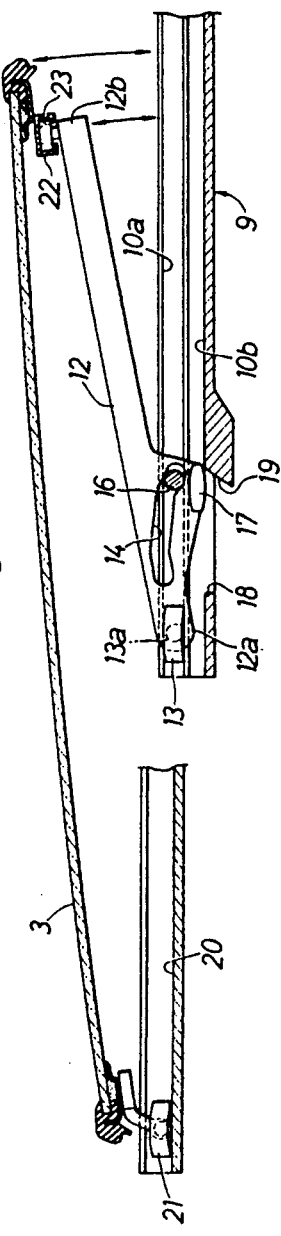

When the push-pull cable 15 is pushed out from this position by the drive device 24, the pin 16 is displaced outwardly along the upper slot 10a. Since the pin 16 is engaged with the lateral slot 14 of the guide arm 12, and the lateral slot 14 inclines downwardly from the part thereof receiving the pin 16, as the pin 16 is moved along the slot 14 by the push-pull cable 15, the projections 17 slide over the slope 19 in the bottom wall of the guide rail 9 and ultimately rides over it to be guided from then on by the lower slot 10b of the guide rail 9. As a result, the guide arm 12 rotates around the pins 13a supporting the slide shoes 13, causing its outer end 12b to move upwardly. This in turn causes the central roof 3 to rotate around the guide shoes 21 engaged with the third guide rail 20, and its rear end moves upwardly (FIG. 7). The other end 12b of the guide arm 12 thus undergoes an arcuate motion, but it is accommodated by the engagement between the roller follower 23 and the second guide rail 22 provided in the lower surface of the central roof 3.

Figure 8:
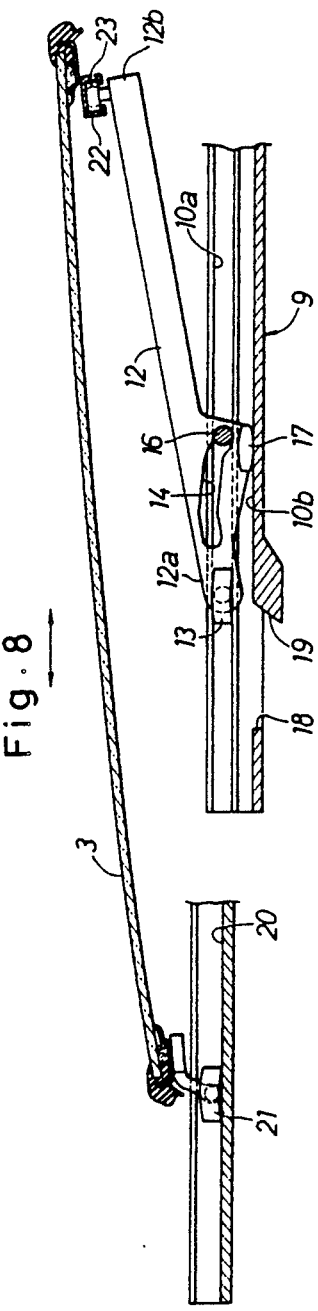

When the push-pull cable 15 is pushed out even further, the slide shoes 13 and the projections 17 are guided by the upper and lower slots 10a and 10b of the guide rail 9, respectively, and move laterally outwardly and rearwardly along the curve defined by the guide rail 9. The rearward component of the motion of the one end 12a of the guide arm 12 is transmitted to the other end 12b of the guide arm 12 and slides the central roof 3 rearwardly (FIG. 8).

Figure 9:
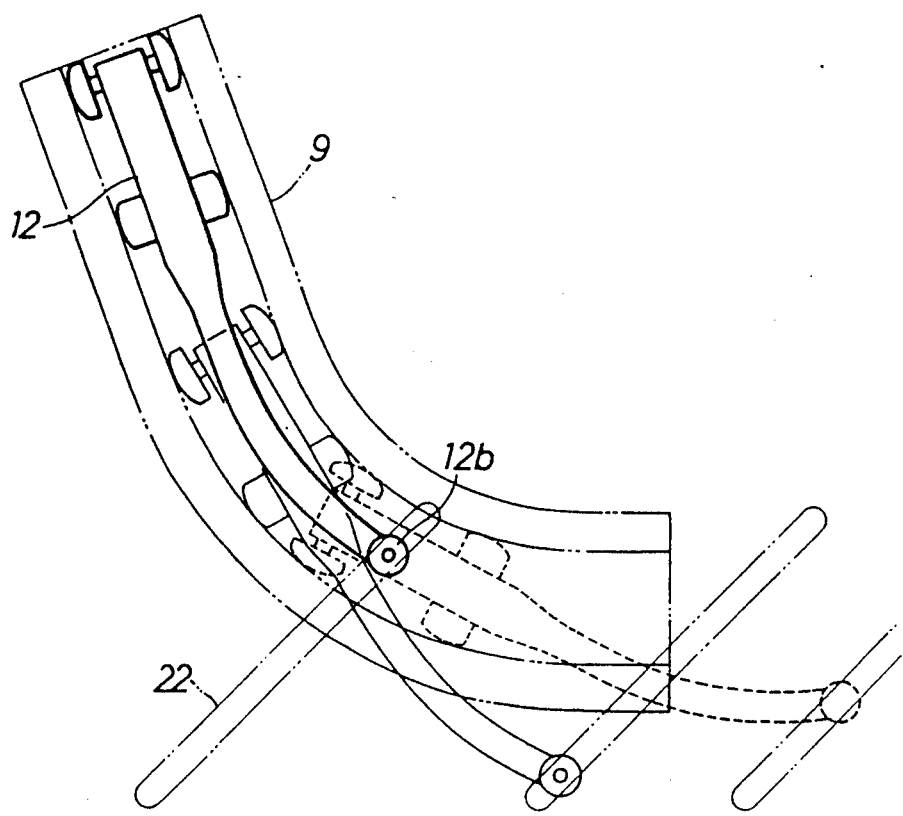
FIG. 9 is a schematic plan view showing how each of the guide arms cooperates with the corresponding first and second guide rails.

At the same time, the guide arm 12 undergoes an angular motion in a horizontal plane as best shown in FIG. 9. In other words, the guide arm 12 is oriented relatively laterally of the vehicle body when the sliding roof 3 is fully closed, but becomes more oriented longitudinally as the sliding roof 3 is slid rearwardly. This contributes to the rearward displacement of the sliding roof 3.

Further, since the guide rail 9 starts from a relatively central part of the vehicle at its frontmost end, but is displaced more laterally outwardly towards the rear part thereof as best shown in FIG. 9, besides from the contribution from the angular motion of the guide arm 12 in a horizontal plane, the motion of the other end 12b of the guide arm 12 contains a lateral component as well as the aforementioned longitudinal component. Since the second guide rail 22 is inclined in such a manner that its inner end is displaced rearwardly, the lateral motion of the other end 12b of the guide arm 12 away from the center of the vehicle body is converted into a rearward motion of the slide roof 3.

Thus, the longitudinal motion of the sliding roof 3 is determined by the above mentioned three factors, and the desired movement of the sliding roof 3 may be attained by any combination of the three factors. Here it should be noted that the utilization of the longitudinal displacement of the other ends 12 of the guide arms 12 for the longitudinal displacement of the sliding roof 3 is indispensable for most practical purposes, but it is possible to utilize only either one of the other two factors. For instance, even when the first guide rails are not curved and extend simply obliquely from a central front part to a laterally outward rear part of the rear roof 4, the resulting lateral component of the motion of the other ends of the guide arms 12 may be converted into a longitudinal displacement of the sliding roof 3 as long as the second guide rails 22 are appropriately inclined. Likewise, even when the second guide rails 22 are not oblique but extend simply laterally of the vehicle body, as long as the first guide rails 9 are appropriately curved, the angular motion of the guide arms 12 can still increase the longitudinal travel of the sliding roof 3 by a distance determined by the angular displacement and the effective arm length of the guide arms 12.

When the central roof 3 is to be closed, the central roof 3 is closed by pulling the push-pull cable 15 and reversing the above described processes.

In such a vehicle having a T-bar roof structure, it is difficult to rigidly support the side ends of the sliding roof since the side ends of the roof adjoining the upper end of the side windows W are free. However, according to the present invention, this problem is solved by connecting the central part of the rear roof 4 which is fixedly attached to the vehicle body with the side ends of the central roof 3 which is moveable by way of the guide arms 12 which extend laterally and rearwardly.

In particular, by using the first guide rails 9 which are either curved or oblique, it is possible to give longitudinal or oblique motion to the guide arms 12 in a smooth fashion. And, by providing a pair of vertically spaced support points for each of the guide arms 12 with respect to the first guide rail 9 and make them spaced apart along the sliding direction as well, it is possible to impart a vertical lifting motion and a horizontal angular motion to the guide arms 12.

Although the above described embodiment was directed to the vehicle body having a T-bar roof structure, the present invention can be applied to other types of vehicle bodies where the guide and linkage mechanism for the sliding roof is desired to be accommodated in a limited space of a rear part of the roof. In particular, when this is applied to two seater vehicles and other vehicles where the roof is highly streamlined and small, and the roof opening capability is to be maximized, the present invention offers a significant advantage.

What we claim is:

1. A vehicle sliding roof system, comprising:
   a fixed front roof;
   a fixed rear roof defining a roof opening in relation with said front roof, the roof opening extending substantially across the entire width of said fixed front and rear roofs;
   a movable central roof located between said fixed front and rear roofs and capable of being selectively moved into and out of position between said fixed front and rear roofs;
   a pair of first guide rails each extending along the upper surface of said rear roof, each said first guide rail extending along one of two predetermined substantially curved directions;
   a pair of guide arms each having two ends, one end pivotally engaged with said moveable central roof;
   first guide shoe means connected to each second end of said guide arms, said guide shoe means slidably engaging each of said pair of guide arms with one of each of said pair of first guide rails, wherein each said guide arm moves in substantially curved motion and along the predetermined substantially curved direction of said corresponding guide rail and
   drive means for moving said second end of each of said guide arms along the corresponding first guide rail.

2. A vehicle sliding roof system as defined in claim 1, wherein
   each of said predetermined substantially curved directions of each said first guide rail extends from a central front part of said rear roof to a laterally more peripheral rear part of said rear roof.

3. A vehicle sliding roof system as defined in claim 1, wherein said guide shoe means further comprises:
   means for orienting said second end of said guide arm within said predetermined substantially curved direction of said corresponding first guide rail.

4. A vehicle sliding roof system as defined in claim 3, wherein said orienting means comprises:
   a first pair of guide shoe members which are attached along a length of each said guide arm.

5. A vehicle sliding roof system as defined in claim 4, wherein each of said first guide rails further comprises:
   means for lifting said guide shoe members and thereby lifting said guide arm with said central roof as said guide arm is moved along the predetermined substantially curved direction of said first guide rail.

6. A vehicle sliding roof system, comprising:
   a fixed front roof having a width;
   a fixed rear roof having a width and an upper surface, and located a predetermined longitudinal distance from said fixed front roof;
   a movable central roof located between said fixed front roof and said fixed rear roof and defining an area that extends substantially across the width of said fixed front and rear roofs and substantially along the longitudinal distance between said fixed front roof and said fixed rear roof;
   said movable central roof being capable of selectively moving into and out of a closed position between said fixed front roof and said fixed rear roof;
   a pair of first guide rails located on the upper surface of said fixed rear roof, each said first guide rail extending along one of two predetermined substantially curved paths;
   a pair of guide arms each having two ends, a first end of said guide arm pivotally connected to said movable central roof;
   first guide shoe means connected to a second end of each said guide arm for slidably engaging each second end of each said guide arm with one of said first guide rails, each said guide arm moving in substantially curved motion and along the predetermined substantially curved path of said corresponding guide rail; and
   drive means for moving said second ends of said guide arms along said first guide rails.

7. A vehicle sliding roof system as set forth in claim 6, wherein:
   a first of said two predetermined substantially curved paths of said first guide rails extends substantially from a front end along a longitudinal centerline of said fixed rear roof to a rear end along a right outer edge of said fixed rear roof; and
   a second of said two predetermined substantially curved paths of said first guide rails extends substantially from the front end along the longitudinal centerline of said fixed rear roof to a rear end along a left outer edge of said fixed rear roof,
   one of said first guide rails having said first of said two predetermined paths, and a second of said first guide rails having said second of said two predetermined paths.

8. A vehicle sliding roof system as set forth in claim 6, wherein said first guide shoe means further comprises:
   means for orienting said second end of each said guide arm within the said predetermined substantially curved path of the said first guide rail.

9. A vehicle sliding roof system as set forth in claim 8, wherein said orienting means comprises:
   a pair of first guide shoe members attached to each said guide arm for slidably engaging and orienting said guide arm with said first guide rail.

10. A vehicle sliding roof system as set forth in claim 9, wherein each said first guide rail further comprises:
    slope guide means for lifting said guide shoe members along said first guide rail and thereby tilting said guide arm and said movable central roof as said guide arm is moved along the predetermined substantially curved path of said first guide rail.

11. A vehicle sliding roof system as set forth in claim 6, further comprising:

a pair of second guide rails provided on a lower surface of said movable central roof and slidably engaged with said first ends of said pair of guide arms, each said second guide rail having one of two oblique paths relative to a front edge of said movable central roof.

12. A vehicle sliding roof system as set forth in claim 11, wherein,
    a first of said two oblique paths of said second guide rails extends substantially from a front end along a right outer edge of said movable central roof toward a rear end of said central roof; and
    a second of said two oblique paths of said second guide rails extends substantially from a front end along a left outer edge of said movable central roof toward the roof end of said central roof,
    one of said second guide rails having said first oblique path, and a second of said second guide rails having said second oblique path.

13. A vehicle sliding roof system as set forth in claim 6 further comprising:
    a central bar member extending between said fixed front roof and said fixed rear roof along a longitudinal centerline of said fixed front and rear roofs;
    a third guide rail located on said central bar member; and
    second guide shoe means pivotally connected to said movable central roof for slidably engaging said movable central roof with said third guide rail.

14. A vehicle sliding roof system as set forth in claim 7, wherein
    said guide arms are substantially conformal to said predetermined paths of said first guide rails such that each said guide arm nests within said corresponding first guide rail when said movable central roof is in the closed position between said fixed front roof and said fixed rear roof.

15. A vehicle sliding roof as set forth in claim 6, wherein said drive means comprises:
    a drive device;
    a pair of flexible push-pull arms each having two ends, one end of each said flexible push-pull arm operatively connected to said drive device, and a second end of each said flexible push-pull arm pivotally connected to one of said guide arms,
    said pair of flexible push-pull arms pulling or pushing said guide arms along said first guide rails to move into or out of the closed position, respectively, said movable central roof in response to an operation of said drive device.

16. A vehicle sliding roof system, comprising:
    a fixed front roof having a width;
    a fixed rear roof having a width and an upper surface, and located a predetermined longitudinal distance from said fixed front roof;
    a movable central roof located between said fixed front roof and said fixed rear roof, and defining an area that extends substantially across the width of said fixed front and rear roofs and substantially along the longitudinal distance between said fixed front roof and said fixed rear roof;
    said movable central roof being capable of selectively moving into and out of a closed position between said fixed front roof and said fixed rear roof;
    guide means for guiding said movable central roof in response to said movable central roof being moved at least one of into and out of the closed position between said fixed front roof and said fixed rear roof;
    a pair of guide arms each having two ends, one end of each said guide arm pivotally connected to said movable central roof and a second end pivotally and slidably engaged with said fixed rear roof;
    means pivotally and slidably engaging the second ends of said guide arms with said fixed rear roof for moving each said guide arm in substantially curved motion along a horizontal curved path in response to said movable central roof being moved at least one of into and out of the closed position between said fixed front roof and said fixed rear roof; and
    drive means for moving said movable central roof at least one of into and out of position between said fixed front roof and said fixed rear roof.

17. A vehicle sliding roof system as set forth in claim 16, wherein said guide means comprises:
    a central bar member extending between said fixed front roof and said fixed rear roof along a longitudinal centerline of said fixed front and rear roofs;
    a first guide rail located on said central bar member;
    guide shoe means pivotally connected to said movable central roof for slidably engaging said movable central roof with said first guide rail.

18. A vehicle sliding roof system as set forth in claim 17 further comprising:
    a pair of second guide rails located on the upper surface of said fixed rear roof, each said guide rail slidably engaged with said means engaging the second end of each said guide arm.

19. A vehicle sliding roof system as set forth in claim 18, wherein
    each said guide arm is substantially conformal with said corresponding second guide rail such that each said guide arm nests within said corresponding second guide rail when said movable central roof is in the closed position between said fixed front and said fixed rear roof.

20. A vehicle tilting roof system, comprising:
    a fixed front roof having a width;
    a fixed rear roof having a width, and located a predetermined longitudinal distance from said fixed front roof,
    a movable central roof located between said fixed front roof and said fixed rear roof and defining an area that extends substantially across the width of said fixed front and rear roofs and substantially along the longitudinal distance between said fixed front roof and said fixed rear roof,
    said movable central roof being capable of selectively tilting into and out of a closed position between said fixed front roof and said fixed rear roof;
    a pair of guide arms each having two ends, one end of each said guide arm pivotally engaged with said movable central roof and a second end having means pivotally and slidably engaged with guide means of said fixed rear roof; and
    said guide means for moving and guiding said guide arms in substantially curved motion along horizontal curved paths in response to said movable central roof being tilted at least one of into and out of the closed position between said fixed front roof and said fixed rear roof.

* * * * *